United States Patent [19]
Yang

[11] Patent Number: 5,617,934
[45] Date of Patent: Apr. 8, 1997

[54] BRAKE MECHANISM OF CASTOR

[76] Inventor: Sung-Wang Yang, No. 258-15, An-Ting, An Chia Tsun, An Ting Shiang, Tainan Hsien, Taiwan

[21] Appl. No.: 645,539

[22] Filed: May 14, 1996

[51] Int. Cl.[6] .................................................. B60B 33/00
[52] U.S. Cl. ........................................ 188/1.12; 16/35 R
[58] Field of Search ............................... 188/1.12, 69, 31; 16/35 R

[56] References Cited

U.S. PATENT DOCUMENTS 5,415,252  5/1995  Estkowski ........................... 188/1.1 R

FOREIGN PATENT DOCUMENTS

| 2656022 | 6/1978 | Germany | 16/35 R |
|---------|--------|---------|---------|
| 6106906 | 4/1994 | Japan | 16/35 R |
| 2255500 | 11/1992 | United Kingdom | 16/35 R |

*Primary Examiner*—Robert J. Oberleitner
*Assistant Examiner*—Chris Schwartz
*Attorney, Agent, or Firm*—Morton J. Rosenberg; David I. Klein

[57] ABSTRACT

The present invention provides a braking mechanism for a castor, which includes a wheel support, two wheels and a brake support. Wherein the wheel support contains an axle suspension with a housing holding a spring and a slide therein. A slotted hole is formed through respective sides of the axle suspension, and two transverse stoppers are respectively formed on the top and bottom portions of the axle suspension, immediately above and below the slotted hole. The brake support extends outwardly to form two flat plates on respective sides thereof and spaced to extend on a respective side wall of the axle suspension, between the upper and lower stoppers. Each plate has a diagonally directed slotted hole formed therethrough for an axle to pass therethrough, through the slotted hole of the axle suspension and through the internal slide. The bias of the spring displaces the axle to the bottom of the slots, displacing the brake support to engage stopping recesses formed in the wheels to latch them against rotation. The brake support is disengaged by application of a downward force on the wheel support sufficient to overcome the spring bias force.

1 Claim, 3 Drawing Sheets

BRAKE MECHANISM OF CASTOR

BACKGROUND OF THE INVENTION

1. Field of the Invention

The present invention relates to a braking mechanism for a castor, and more particularly to a braking device that locks up the wheels to a skid platform accurately and stably.

2. Prior Art

In accordance with the common design of an office chair, a skid platform and serving trolley, they all have rotatable castors attached to their legs. Some of the prior art castors are equipped with a braking mechanism that is able to stop the castor from rolling. As shown in FIG. 4 and FIG. 5, the braking mechanism of a conventional castor consists of a wheel support A having an axle suspension A1 with a housing A11, a pair of slotted holes A12 formed through opposing sides of the housing A11 and two skid shoes A2 extending outwardly from the top portion of the housing A11. A spring B and a slide C are sequentially seated in the housing A11. The slide C has a hole C1 in alignment with the slotted holes A12 for receiving the axle D therethrough. The two axial-tag terminals of the axle D are respectively plugged into two opposing dishing wheels E. In a first state of the wheels E, as shown in FIG. 4, the wheels are sitting on the ground. The wheels E, the axle D and the slide C work as a linked assembly, while the spring B on the slide C pushes up the wheel support A so that the axle D slides down along the slotted holes A12 of the axle suspension A1, until the skid shoes A2 at the top of the housing A11 touch against the inside walls of the wheels E. The skid shoes A2 function as a brake for the wheels E. When the wheel support A is pressed down by a force as shown in FIG. 5, the spring B in the axle suspension A1 is depressed downwardly so that the skid shoes A2 at the top of the housing A11 depart from contact with the wheels E, thereby releasing the wheels E so that they are free to roll.

Accordingly the design of the conventional castor brake depends only on the frictional force between the skid shoes and the inside wall of the wheels to stop movement of the trolley. That arrangement makes it difficult to completely stop the wheels. The wheels still have a differential motion with respect to the wheel support, and after a certain period of time, the skid shoes are worn where they contact the wheels, which degrades their braking effect.

SUMMARY OF THE INVENTION

It is the primary object of the present invention to provide a braking mechanism for castors which enables the wheels to be stopped entirely and stably.

It is another object of the present invention to provide a braking mechanism for castors which braking state can be released by the weight of a human body on the chair having the castors, and which mechanism does not require the use of hands to operate.

DESCRIPTION OF THE DRAWINGS

Figure 1:
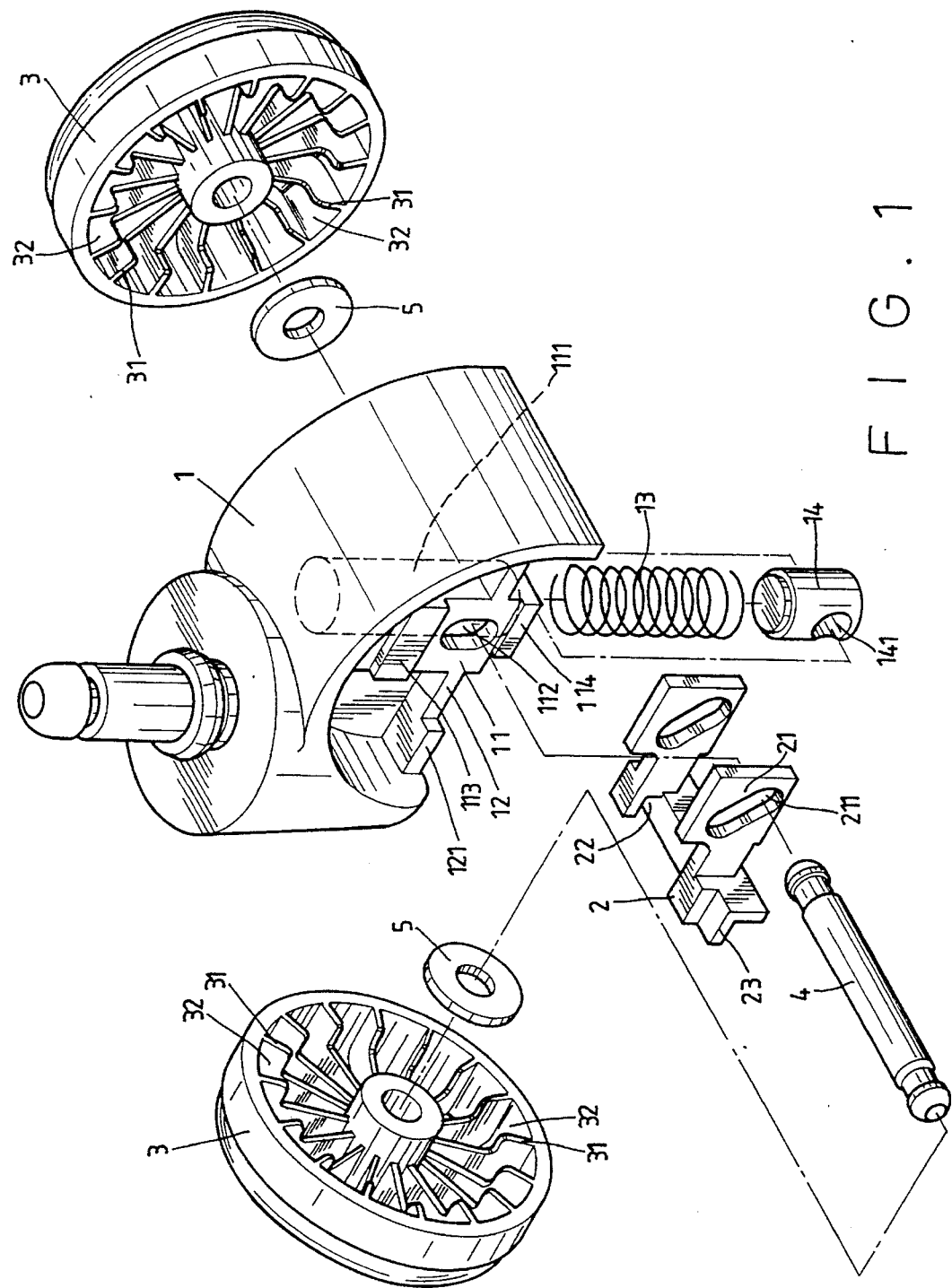
FIG. 1 is an exploded view of a castor of the present invention.

Referring to FIG. 1, the present invention includes a wheel support 1, a brake support 2 and two wheels 3.

The wheel support 1 is formed with a semicircular wheel cowl, in which a vertical axle suspension 11 is formed along the center of the cowl to divide the cowl into two equal open spaces. The axle suspension 11 contains a housing 111 opening downwardly, two slotted holes 112 formed on respective opposing side walls of the housing 111 in correspondence with each other, and a pair of stoppers 113 and 114 formed on the top and the bottom portions of the side walls, respectively. The bottom portion of the axle suspension 11 has a cross member 12 extending horizontally with two level overhangs 121 respectively extending from opposing sides. The housing 111 is adapted to receive a spring 13 and a slide 14 therein. The slide 14 has a through hole 141 formed therethrough.

The brake support 2 is a U-shaped frame having a pair of plates 21 at respective sides with diagonally directed slotted holes 211 formed through each plate 21. The brake support has a pair of fitting recesses 22 formed in respective inner side walls thereof, respectively corresponding to the plates 21, and a pair of lugs 23 on the outer sides thereof.

The wheel 3 is a circular recessed shell having a plurality of fins 31 secured to the inner portion thereof and radially spaced from each other defining stopping grooves 32 therebetween.

To assemble the present invention, the brake support 2 is inserted into the wheel support 1 with the plates 21 sliding in between the transverse upper and lower stoppers 113 and 114, on both sides of the wheel support 1. The diagonally slotted holes 211, the vertically slotted holes 112 and the through hole 141 of slide 14 are aligned with each other for insertion of the axle 4 therethrough. Lastly, the wheels 3 are secured onto the axle 4 with washers 5 disposed between the wheels and the plates 21.

Figure 3:
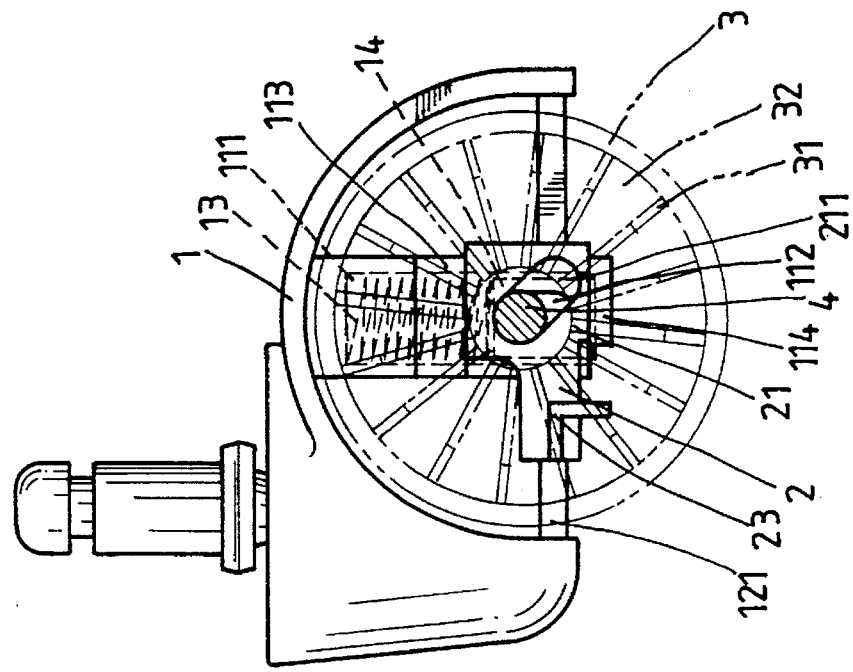
FIG. 3 is a view similar to FIG. 2, but showing an unlocking state of the present invention.
Figure 2:
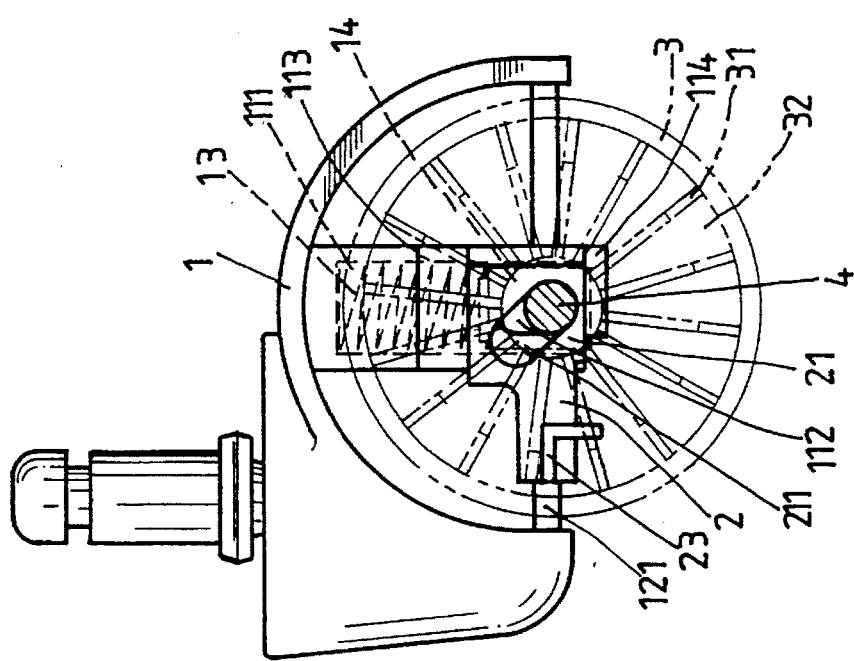
FIG. 2 is a side elevation view showing a locking state of the present invention.
Figure 4:
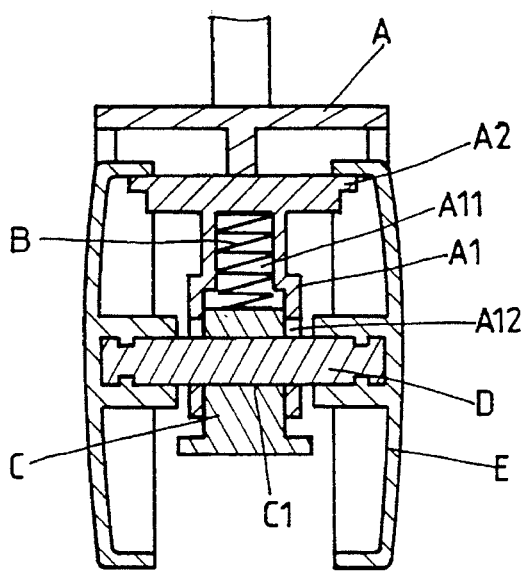
FIG. 4 is a front cross-sectional view showing a braking state of the conventional castor; and, FIG. 5 is a further front cross-sectional view showing the released state of the conventional castor.
Figure 5:
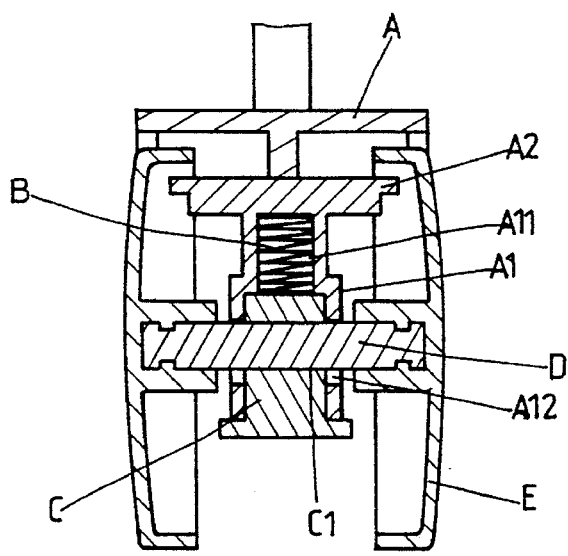

When the castor of the present invention is in a braking state, as shown in FIG. 2, the spring 13 in the housing 111 of the axle suspension 11 urges the slide 14 and the axle 4 downwardly, touching the bottom portion of the vertical slotted hole 112 of the axle suspension 11. Under these conditions, the bottom of the diagonal slotted holes 211 on the flat plates 21 of the brake support 2 are in touch with the bottom portion of the axle 4. Meanwhile, the brake support 2 is in an overhanging state, the fitting recesses 22 fit on the respective overhangs 121 of the cross member 12, and the lugs 23 extend into the stopping grooves 32 of the respective wheels 3, to latch the wheels against rotation. Further, when the wheel support 1 is depressed by a force which is greater than the urging force of the spring 13, the spring 13 is compressed so that the wheel support 1 moves downward, as shown in FIG. 3. Under that condition, the axle 4 slides upward along the vertical slotted hole 112 of the axle suspension 11 and the diagonal slotted holes 211 on the flat plates 21 of the brake support 2. Since the brake support 2 is confined by the upper and the lower stoppers 113, 114, it moves laterally forward to disengage the lugs from the respective stopping grooves 32, allowing the wheels to roll freely.

I claim:

1. A castor and breaking mechanism therefor, comprising:

an axle;

a pair of wheels coupled to opposing ends of said axle, each of said wheels having a plurality of radially spaced fins formed on an inner side thereof to define a plurality of stopping grooves between respective pairs of said plurality of fins;

means for supporting said pair of wheels, said wheel support means including a longitudinally directed semicircular wheel cowl and axle suspension means disposed centrally and extending longitudinally in said wheel cowl for supporting said axle in a direction transverse said longitudinal direction, said axle suspension means including (1) a housing having a vertically directed bore formed therein, said housing having a pair of vertically slotted openings formed through opposing sides thereof in open communication with said bore and aligned in said transverse direction for passage of said axle therethrough, (2) two pairs of stoppers extending transversely from said housing, each pair of said two pairs of stoppers being disposed in spaced parallel relationship and in spaced relationship with respective opposing ends of a respective one of said slotted openings, (3) a spring disposed within said bore, and (4) a slide member disposed within said bore adjacent said spring, said slide member having a through hole formed transversely therein and aligned with said slotted openings for passage of said axle therethrough; and, a brake support having a pair of longitudinally extended plates disposed in spaced parallel relationship on opposing transverse sides of said housing, each of said plates being positioned between a respective pair of said stoppers and have a diagonally directed slotted opening formed therethrough and disposed in alignment with a respective slotted opening in said housing for passage of said axle therethrough, said brake support having a pair of opposing transversely directed lugs formed on one end thereof for reversible latching engagement with a respective one of said plurality of stopping grooves of said pair of wheels, wherein said brake support is linearly displaced in a first direction for latching engagement with said pair of wheels by displacement of said axle in a second direction within said slotted openings of said pair of plates and said housing responsive to a bias force of said spring, said brake support being linearly displaced in a direction opposite said first direction by displacement of said axle in a direction opposite said second direction within said slotted openings of said pair of plates and said housing for disengaging said brake support from said pair wheels responsive to a force applied to wheel support means sufficient to overcome said bias force of said spring.

\* \* \* \* \*